3,494,109
COOLING TOWER APPARATUS
Benjamin V. Blazer, Paterson, and Mahmoud S. El-Tahry, Passaic, N.J., assignors to Blazer Corporation, East Rutherford, N.J., a corporation of New Jersey
Filed July 5, 1968, Ser. No. 742,567
Int. Cl. B01d 50/00
U.S. Cl. 55—257                              11 Claims

ABSTRACT OF THE DISCLOSURE

An improved cooling tower apparatus includes an air fan centrally located at the bottom of the tower, and a pivoted shutter arrangement disposed above the fan. The fan generates an air flow which reacts with a heated liquid flowing downward through the tower via a plurality of evaporating surfaces. The shutter structure is adapted to pass the fan generated air flow for cooling purposes while preventing the escape of fluid or vapor laden air from the tower fan orifice, thus obviating a potentially hazardous condensation condition.

DISCLOSURE OF INVENTION

This invention relates to heat transfer apparatus and, more specifically, to an improved cooling tower arrangement for cooling a heated liquid by an evaporation process.

Heat exchanging apparatus for cooling a flowing heated liquid with a counter-flowing air stream has been widely employed. Such arrangements typically employ nozzles for supplying a heated liquid into the tower, with the liquid flowing downward under the action of gravity. Blowing apparatus is employed to generate an upward air flow exiting through the top of the tower. The moving air stream reacts with, and cools the liquid by an evaporation process.

However, prior art cooling tower arrangements have been characterized by one or more of the deficiencies considered hereinbelow, and have thus not been completely satisfactory. First, the requisite air blowing fans have commonly been located at the top of the cooling tower to induce an upward air flow, with the air radially entering the tower through apertures located about the bottom periphery thereof. Accordingly, such an induced draft, or "draw through" cooling tower must be fabricated of strong structural materials to support the relatively weighty top-mounted fan and its attendant driving apparatus. This problem is often compounded throughout an entire building structure since the cooling towers are placed on top of the building in many installations. Then also, relatively large, oversized fans are required for such an arrangement since the air flow is induced by the relatively inefficient low pressure, upstream side of the fan, and not by the more efficient discharge fan side. Further, fan maintenance is complicated since all work must be performed on top of the tower.

Of special importance, air carrying considerable water vapor escapes from the tower through the lower tower apertures included in the induced draft and other tower configurations. The vapor so conveyed oftentimes condenses on the building top thus forming water pools and, in winter, ice formations. Such water and/or ice collection creates hazardous conditions for tower maintenance and other roof top activities; causes structural damage attributable to corrosive and weight effects; and also periodically generates a potentially harmful water flow running off the building top.

One alternative building tower configuration employs one or more blower fans mounted external to the tower about its lower periphery, thus largely obviating the structural problems accruing to tower top fan mounting. However, the horizontally protruding fans impart a large vertical profile to such cooling towers which thus take up a relatively large roof area for any given cooling capacity. Also the fans, located at best at a number of discrete locations, do not produce an air flow which is uniform throughout the tower. Thus segments of the flowing heated liquid are not acted upon by a significant counter air flow and are thus not cooled appreciably. Further, vapor can escape from such towers through the fan mounting apertures when the fans are inactive.

It is thus an object of the present invention to provide an improved cooling tower arrangement.

More specifically, it is an object of the present invention to provide a cooling tower arrangement having a fan located at the bottom portion thereof to facilitate maintenance access to the fan, and to permit fabricating the tower of relatively light, inexpensive structural materials making maximum use of prefabrication techniques, rather than site work construction.

Still another object of the present invention is the provision of a cooling tower arrangement which prevents water vapor from escaping from the lower portion thereof, and which occupies a relatively smaller surface area.

The above and other objects of the present invention are realized in a specific, illustrative cooling tower arrangement which includes a nozzle array for spraying water for downward translation through a plurality of corrugated evaporating surface plates. A fan is centrally located at the bottom of the tower and generates an upward air flow through the evaporating surfaces acting through a pivoted shutter plate arrangement disposed vertically above the fan.

During the cooling process, the velocity pressure generated by the fan keeps the pivoted shutter plates open and the air flow uniformly passes through the evaporating plates where it reacts with, and efficiently cools the downward moving heating liquid. The discharge velocity pressure produced by the energized fan is more than sufficient to prevent liquid and water vapor from escaping from the tower through the fan orifice.

When the liquid has been sufficiently cooled, a temperature sensor is adapted to de-energize the fan. The pivoted plates respond to the absence of the fan's generated velocity pressure by rotating downward thus sealing the fan orifice. Hence, liquid and vapor is prevented from escaping through the fan aperture when the fan is inert.

A complete understanding of the present invention and of the above and other features and advantages thereof may be gained from a consideration of the following detailed description of an illustrative embodiment thereof presented hereinbelow in conjunction with the accompanying drawing which comprises a schematic cross-sectional diagram of a cooling tower arrangement which embodies the principles of the present invention.

Referring now to the drawing, there is shown a composite cooling tower 10 of any desired cross-sectional shape having side walls 14, an open top 12, bottom surfaces 16, an inner wall portion 18, and standoff mounting apparatus 20. The tower 10 is located on a surface 5 which may illustratively comprise the top of a building.

Heated liquid, for example, water is supplied by a heat source 40 to a plurality of emitting nozzles 32 by way of trunk and branch conduits 30 and 31. The water flows downward through a plurality of corrugated evaporating surface plates 22 into a reservoir area 21 defined by the cooling tower's members 14, 16 and 18. Water is recirculated from the reservoir 21 to the heat source 40 and eventually to the nozzles 32 by a conduit 41. The recirculation path may illustratively comprise any combina-

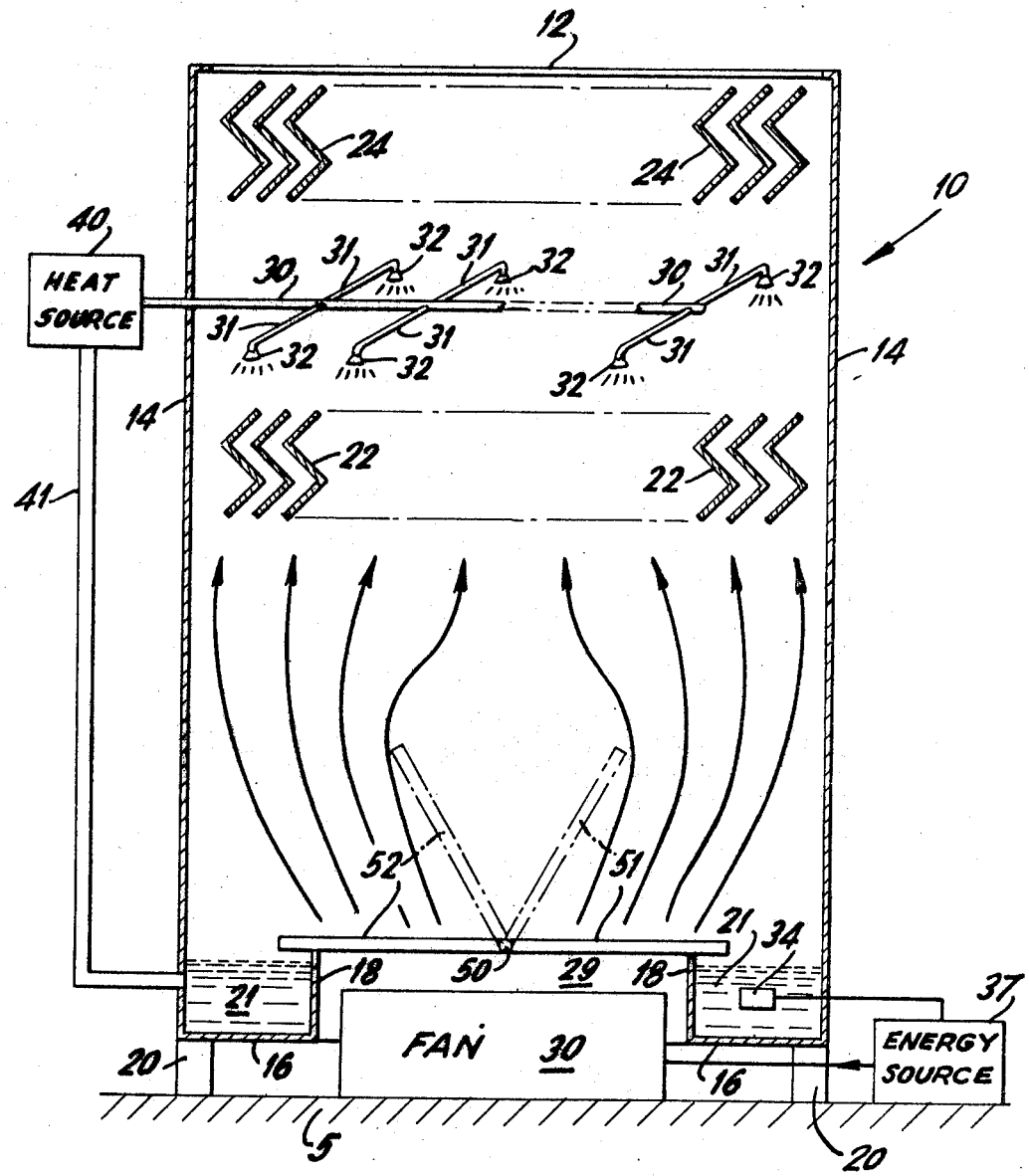

leted. Such exhausted air is typically characterized by a lower moisture content than ambient air, and thus will cool the water down to a lower temperature. Accordingly, a reduced water flow may be utilized for any given cooling load and, consequently, smaller apparatus and a reduced pumping capacity may be employed.

Further, an additional cylindrical tower member may be mounted outside of the member 18, and have at least a portion thereof disposed above the top of the member 18. When an axial fan 30 is mounted at the same height as the exposed surface of this additional member, any large drop of fluid which somehow falls into the orifice 29 will be impelled by the fan blades onto the inner wall of the additional member, and thence fall for collection into the reservoir 21. The shutter elements 51 and 52 may have a rest position on top of the additional member or on top of the member 18 as desired.

What is claimed is:

1. In combination, a cooling tower including a fan orifice in the bottom portion thereof, a fan mounted about the bottom of said tower for generating an upward air flow in said tower via said orifice, means for injecting a flow of fluid in said tower, and means for covering said fan when said fan is de-energized and for opening said orifice and passing said air flow upward through said tower when said fan is energized, said fan orifice selective covering means including pivotally mounted means disposed above said fan.

2. A combination as in claim 1 further comprising a plurality of evaporating surface plates included in said tower and mounted intermediate said selective fan covering means and said fluid inserting means.

3. A combination as in claim 1 wherein said pivotally mounted means includes at least one shutter member pivoted for rotation above said fan.

4. A combination as in claim 2 further comprising transducer means for sensing the temperature of said heated fluid, and controlled energy source means for selectively energizing said fan under control of said transducer means.

5. A combination as in claim 4 further comprising corrugated eliminator plates included in said tower and mounted above said fluid inserting means.

6. A combination as in claim 5 wherein said fluid inserting means includes a plurality of nozzles for spraying said heated fluid onto said evaporating surface plates.

7. A combination as in claim 6 wherein said fan is of the axial type.

8. A combination as in claim 1 wherein said bottom mounted fan comprises duct means coupled to said fan orifice, and a fan for driving air through said duct means.

9. A combination as in claim 1 further comprising fluid conduit means included in said tower and mounted intermediate said selective fan covering means and said fluid inserting means.

10. In combination, a cooling tower, a fan fixed at the bottom central portion of said tower for directing an air flow upward through said tower, a plurality of evaporating surface plates mounted in said tower, means for inserting a heated fluid into said tower above said evaporating plates, and covering means mounted intermediate said fan and said evaporating plates for passing air from said fan to said evaporating plates and for preventing said fluid from flowing from said plates to said fan, wherein said covering means includes shutter means pivotally mounted for rotation above said fan.

11. A combination as in claim 10 further comprising transducer means for sensing the temperature of said heated fluid, and controlled energy source means for selectively energizing said fan under control of said transducer means.

References Cited

UNITED STATES PATENTS

| 978,986 | 12/1910 | Burhorn | 261—64 |
| 1,986,653 | 1/1935 | Wade. | |
| 2,890,870 | 6/1959 | Spiselman | 261—112 X |

HARRY B. THORNTON, Primary Examiner.

STEVEN H. MARKOWITZ, Assistant Examiner

U.S. Cl. X.R.

261—26, 64, 108, 117